US012104406B2

(12) United States Patent
Skogström et al.

(10) Patent No.: US 12,104,406 B2
(45) Date of Patent: Oct. 1, 2024

(54) ELECTRONIC PADLOCK

(71) Applicant: Abloy Oy, Joensuu (FI)

(72) Inventors: Peter Skogström, Joensuu (FI); Ville Heiskanen, Kontiolahti (FI)

(73) Assignee: ABLOY OY, Joensuu (FI)

( * ) Notice: Subject to any disclaimer, the term of this patent is extended or adjusted under 35 U.S.C. 154(b) by 220 days.

(21) Appl. No.: 17/923,854

(22) PCT Filed: May 7, 2021

(86) PCT No.: PCT/FI2021/050336

§ 371 (c)(1),
(2) Date: Nov. 7, 2022

(87) PCT Pub. No.: WO2021/229143

PCT Pub. Date: Nov. 18, 2021

(65) Prior Publication Data

US 2023/0175290 A1 Jun. 8, 2023

(30) Foreign Application Priority Data

May 13, 2020 (FI) ..................................... 20205477

(51) Int. Cl.
*E05B 47/00* (2006.01)

(52) U.S. Cl.
CPC .. *E05B 47/0012* (2013.01); *E05B 2047/0084* (2013.01)

(58) Field of Classification Search
CPC .. E05B 47/00; E05B 47/0012; E05B 47/0001; E05B 47/0002; E05B 81/00;
(Continued)

(56) References Cited

U.S. PATENT DOCUMENTS

2009/0282876 A1* 11/2009 Zuraski ................. E05B 67/003 70/278.1
2016/0292942 A1* 10/2016 Ranchod ................. E05B 67/22
2017/0169637 A1* 6/2017 Lai ...................... E05B 37/0068

FOREIGN PATENT DOCUMENTS

CN 205531813 U 8/2016
CN 110656821 A 1/2020
(Continued)

*Primary Examiner* — Nathan Cumar
(74) *Attorney, Agent, or Firm* — Muncy, Geissler, Olds & Lowe, P.C.

(57) ABSTRACT

The object of the invention is to provide an electronic padlock (1), by means of which the chance of erroneous opening of the electronic padlock is reduced. The electronic padlock according to the invention comprises a body (2) and a shackle (3). The body has latch parts (4), a cam piece (5) and an electronic actuator (6). The electronic actuator (6) comprises a pivot shaft (7), which is arranged to turn the cam piece (5) to release the latch parts (4) from a locking state, and also to turn the cam piece (5) to hold the latch parts in the locking state. In the locking state, the latch parts (4) prevent the shackle (2) from being moved to open the electronic padlock (1). Between the electronic actuator (6) and cam piece (5) there is a blocking mechanism (8). The blocking mechanism connects the pivot shaft (7) of the electronic actuator (6) functionally to the cam piece (5) to turn it with the electronic actuator (6) and prevent any other turning of the cam piece (5) in relation to the body (2).

7 Claims, 3 Drawing Sheets

Figure 1:
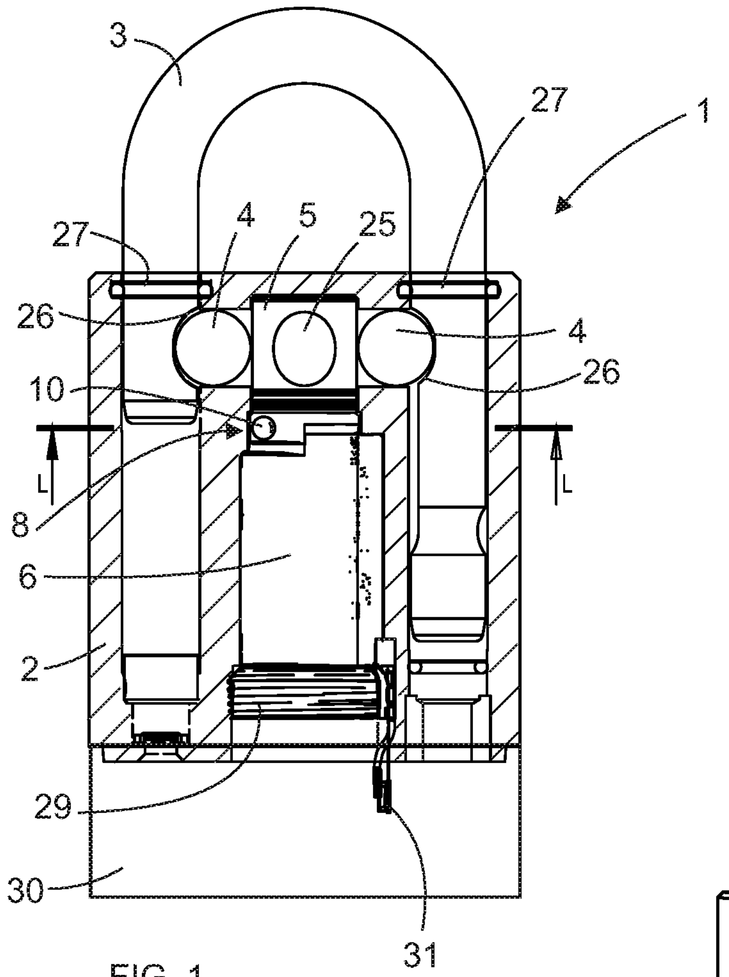

(58) Field of Classification Search
CPC .......... E05B 81/08; E05B 67/00; E05B 67/06; E05B 67/063; E05B 67/08; E05B 2047/0013; E05B 2047/0084
USPC .......................................................... 70/279.1
See application file for complete search history.

(56) References Cited

FOREIGN PATENT DOCUMENTS

| | | | | |
|---|---|---|---|---|
| WO | WO-2017097186 | A1 | * | 6/2017 |
| WO | WO-2018184070 | A1 | * | 10/2018 |
| WO | WO-2019119631 | A1 | * | 6/2019 |

* cited by examiner

ELECTRONIC PADLOCK

FIELD OF THE INVENTION

The invention relates to electronic padlocks. The invention particularly relates to electronic padlocks, in which an electronic actuator is arranged to turn a cam piece in order to release latch parts from a locking state. When the latch parts are released from the locking state, the electronic padlock can be opened.

PRIOR ART

Prior art electronic padlocks often use an electronic actuator for opening the locking. The electronic padlock can receive an opening code in different ways, depending on the implementation method. The opening code can be entered in the electronic padlock for example from a mobile phone via a Bluetooth connection or via some other wireless network. RFID technology or NFC technology can also be used. The electronic padlock can also have a keyboard or a touch screen for entering the opening code, or the lock has for example a fingerprint identifier. When the correct opening code has been entered into the electronic padlock, the electronic actuator in the lock releases the locking, whereby the padlock can be opened. When the locking is released, the padlock shackle can be moved from the closed position to the open position, i.e. the padlock can be opened.

The electronic actuator can for example be an electric motor, which is arranged to turn the cam piece of the padlock. The cam piece is a part, which holds the latch parts against counter holes in the shackle, when the padlock is locked. When the electronic padlock receives the correct opening code, the electronic actuator turns the cam piece (usually 90 degrees), so that the recesses in the cam piece are by the latch parts. Thus, the latch parts can move away from the counter holes in the shackle, i.e. the locking state is released, and the electronic padlock can be opened. When the electronic padlock is locked, the shackle is in the closed position and the electronic actuator turns the cam piece into the locking position, whereby it holds the latch parts against the counter holes in the shackle. The latch parts are normally balls.

In electronic padlocks like the one described above, the turning of the cam piece can be limited only by internal friction in the electronic actuator or its gearing. Thus, it can also be possible that by knocking on the electronic padlock, the cam piece can be made to erroneously turn, whereby the electronic padlock is no longer locked and it can be opened.

WO 2018184070 presents one implementation of an electronic padlock, where a coil spring affects the turning of the cam piece. In this solution, the coil spring strives to hold the cam piece in the locking position. In the solution of the WO publication, there is a blocking piece and a turning knob in connection with the electronic actuator. When the blocking piece is released from the blocking position with the aid of the electronic actuator, the turning knob can be turned manually in order to turn the cam piece and open the electronic padlock. Thus, in this solution, the cam piece is turned manually against the coil spring in order to open the lock.

WO 2017/097186 an electronic padlock with a blocking mechanism having a solenoid. WO 2019/119631 discloses an electronic padlock with a blocking mechanism having a plate with cavity. CN 205 531 813 discloses also an electronic padlock having a clutch mechanism.

BRIEF DESCRIPTION OF THE INVENTION

The object of the invention is to provide an electronic padlock, which reduces the possibility of erroneous opening of the electronic padlock or even eliminates the possibility of erroneous opening. This is achieved in the manner presented in the independent claim. The dependent claims present different embodiments of the invention.

The electronic padlock according to the invention comprises a body and a shackle. The body has latch parts, a cam piece and an electronic actuator. The electronic actuator comprises a pivot shaft, which is arranged to turn the cam piece to release the latch parts from a locking state, and also to turn the cam piece to hold the latch parts in the locking state. In the locking state, the latch parts prevent the shackle from being moved to open the electronic padlock. Between the electronic actuator and the cam piece there is a blocking mechanism in the direction of the pivot shaft of the electronic actuator. The blocking mechanism connects the pivot shaft of the electronic actuator functionally to the cam piece to turn it with the electronic actuator and prevent any other turning of the cam piece in relation to the body.

The blocking mechanism comprises a locking plate, a latch piece and a driver. The locking plate is connected to the pivot shaft of the electronic actuator. The locking plate has a peripheral edge, which has a release recess. The locking plate is also arranged to be turned in relation to the driver. The driver has a torsion projection, which is connected to the cam piece. The driver also has a hole, in which the latch piece is placed, and the body has a recess for the latch piece.

The blocking mechanism is arranged to prevent turning of the cam piece, when the latch piece is partly in the recess and partly in the driver hole, and the peripheral edge of the locking plate prevents the latch piece from moving toward the pivot shaft. The blocking mechanism is also arranged to allow turning of said cam piece, when the electronic actuator has by turning the pivot shaft turned the release recess of the locking plate to the driver hole, allowing the latch piece to move toward the pivot shaft. Still continuing the turning of the pivot shaft with the electronic actuator, in addition to the locking plate, the driver and the thereto connected cam piece also turn.

The blocking mechanism additionally comprises a spring, which is supported on the driver and which spring has a spring head. The locking plate comprises a hole for the spring head. The spring head is in the hole, when the latch piece is partly in the recess and partly in the driver hole, and the peripheral edge of the locking plate prevents the latch piece from moving toward the pivot shaft.

LIST OF FIGURES

Figure 2:
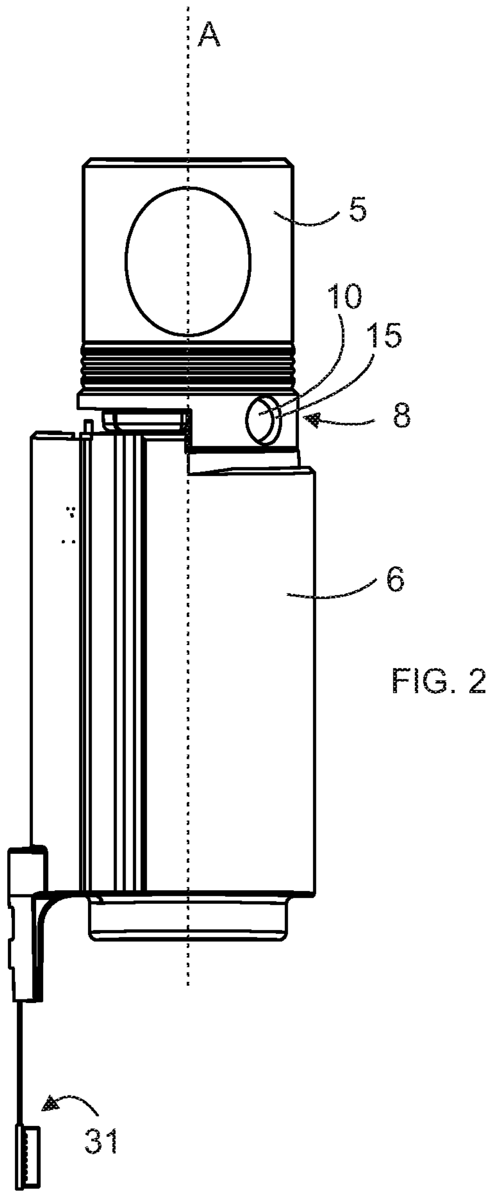
Figure 3:
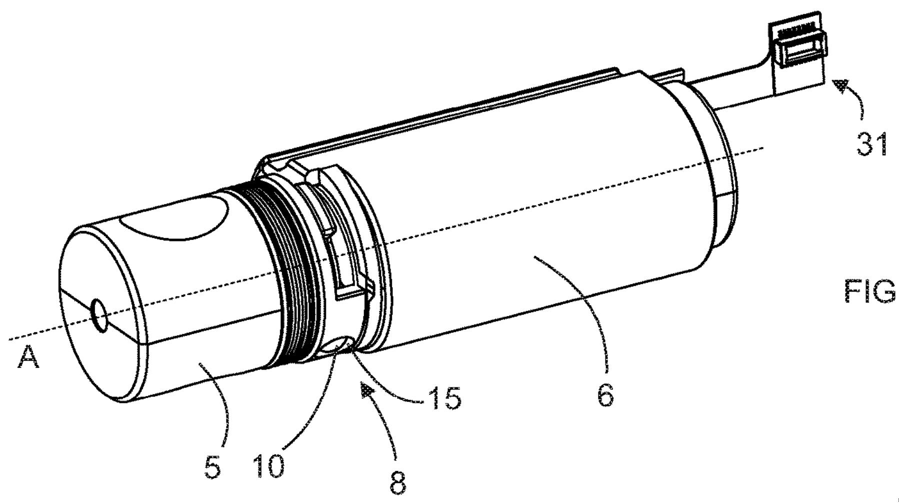
Figure 4:
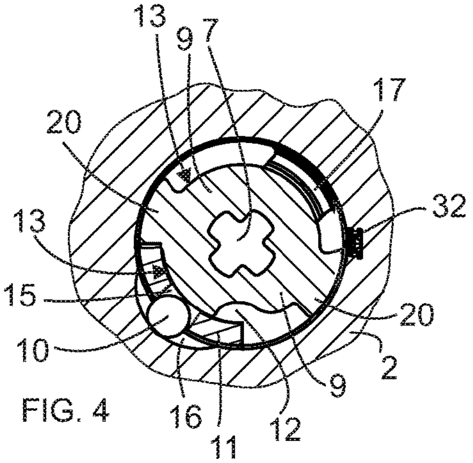
Figure 5:
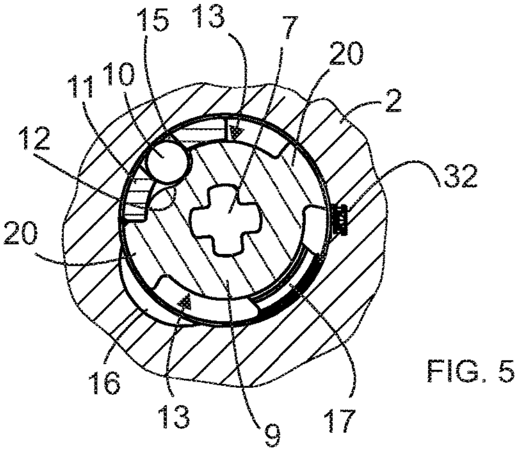
Figure 6:
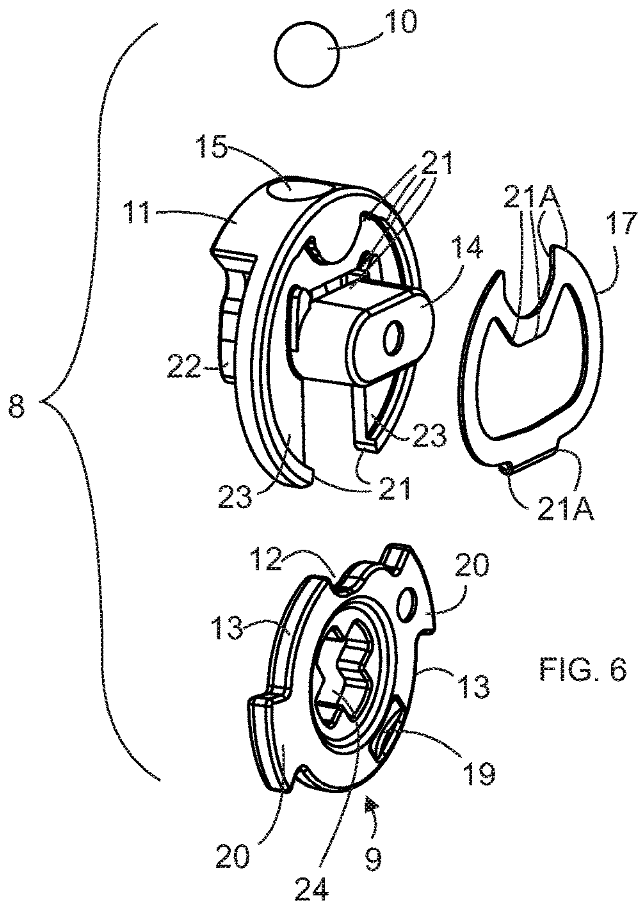
Figure 7:
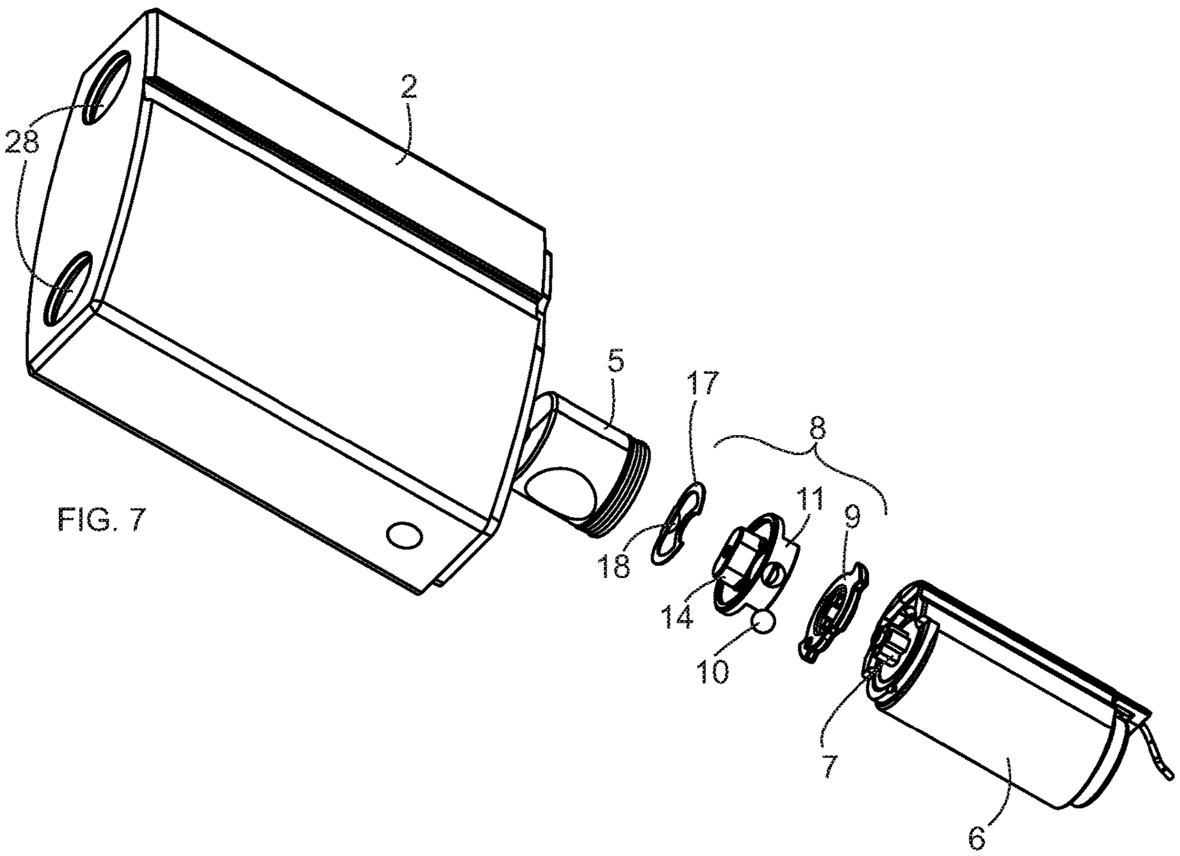
Figure 8:
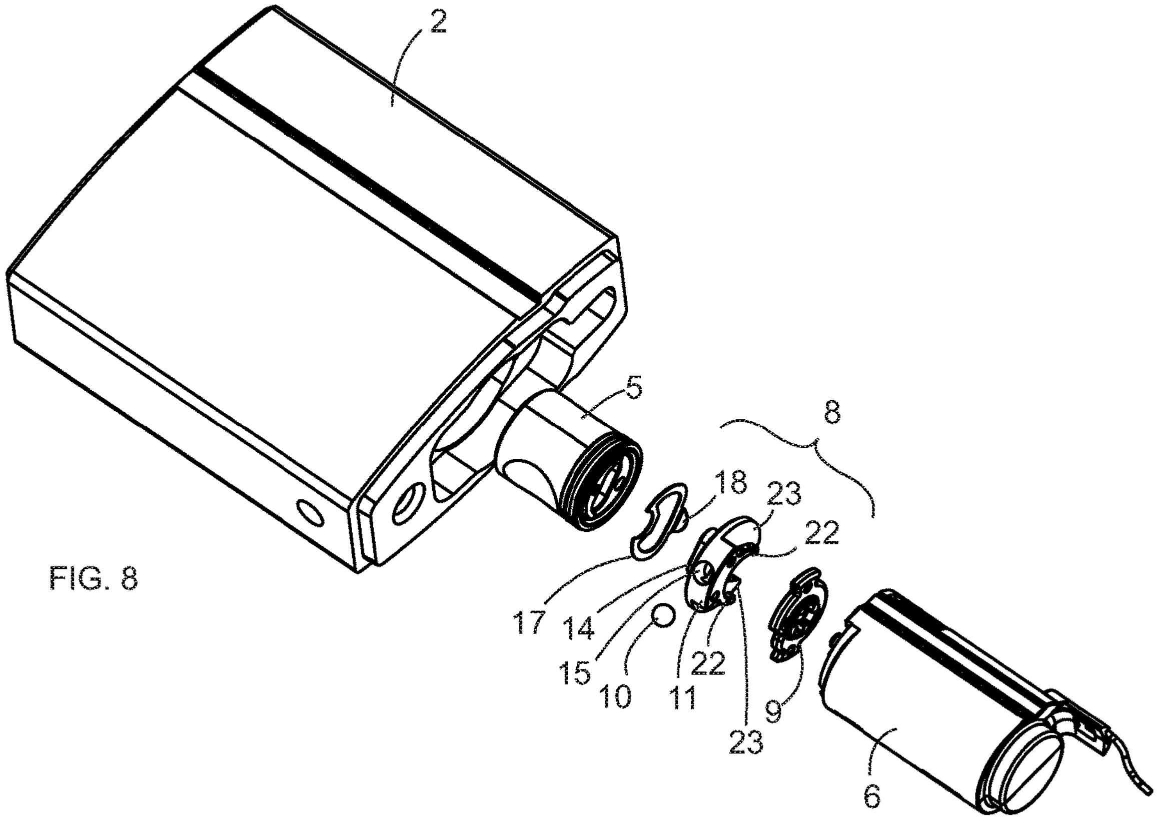

In the following, the invention will be described in more detail with reference to the appended figures, in which FIG. 1 shows an example of an electronic padlock according to the invention, FIG. 2 shows an example of an electronic actuator, a blocking mechanism and a cam piece of an electronic padlock according to the invention, FIG. 3 shows the example of FIG. 2 from another angle, FIG. 4 shows a partial section of the example of FIG. 1 with the electronic padlock locked, FIG. 5 shows a partial section of the example of FIG. 1 with the electronic padlock locking released, FIG. 6 shows an example of the blocking mechanism, FIG. 7 shows an example of the parts of an electronic padlock according to the invention, and FIG. 8 shows the example of FIG. 7 from another angle.

DESCRIPTION OF THE INVENTION

FIG. 1 shows an example of an electronic padlock 1 according to the invention. The electronic padlock according to the invention comprises a body 2 and a shackle 3. The body has latch parts 4, a cam piece 5 and an electronic actuator 6. The electronic actuator comprises a pivot shaft 7 (FIG. 7), which is arranged to turn the cam piece 5 to release the latch parts 4 from a locking state, and also to turn the cam piece 5 to hold the latch parts 4 in the locking state. In the locking state, the latch parts 4 prevent the shackle 3 from being moved to open the electronic padlock. FIG. 1 shows the locking state. When the cam piece is turned (usually 90 degrees or about 90 degrees), the recesses 25 in the cam piece are toward the latch parts. Thus, the latch parts can move away from the recesses 26 in the shackle 3, and the shackle can be pulled out of the body 2. Moving the shackle away from the body 2 opens the loop between the shackle and the body, i.e. the electronic padlock is thus opened. FIG. 4 shows a partial section along line L with the electronic padlock 1 locked and FIG. 5 with the locking opened.

FIG. 1 also shows other parts of the electronic padlock, such as sealing rings 27 in the shackle openings 28 (FIG. 7), an attaching part 29 and a communication part 30. The attaching part holds the electronic actuator 6, the blocking mechanism 8 and the cam piece 5 in the body 2 well, which is meant for these parts. The communication part 30 comprises for example an RFID part, a Bluetooth part or another part to receive an opening code for the electronic padlock and possibly also to send information about the state and operation of the electronic padlock. The communication part is in connection with the electronic actuator 6 via a connecting part 31. When the opening code is correct, the electronic actuator can function to open the locking. A power source, such as a battery and control electronics, can also be placed in connection with the communication part. It is however also possible that the power source (e.g. a battery) is placed in connection with the electronic actuator 6, as also the control electronics.

FIG. 1 thus does not show all parts of the electronic padlock, and as can be seen, the electronic padlock can be realized in many different ways. The communication part can for example be placed in a different way in relation to the body 2 and it can for example have a keyboard or a touch screen or a fingerprint identifier. The electronic padlock can also have different identifiers for detecting the state and operations of the lock. FIG. 1 strives to illustrate the necessary parts of the invention.

Between the electronic actuator 6 and the cam piece 5 there is a blocking mechanism 8 in the direction of the pivot shaft 7 of the electronic actuator. The blocking mechanism 8 connects the pivot shaft 7 of the electronic actuator functionally to the cam piece 5 to turn it with the electronic actuator 6 and prevent any other turning of the cam piece 5 in relation to the body 2. FIG. 2 and FIG. 3 show the placement of the electronic actuator 6, the cam piece 5 and the blocking mechanism 8 on the same axis A, i.e. in the direction of the pivot shaft 7 of the electronic actuator.

FIG. 6 shows an example of the blocking mechanism. The blocking mechanism 8 comprises a locking plate 9, a latch piece 10 and a driver 11. The locking plate 9 is connected to the pivot shaft 7 of the electronic actuator. The locking plate has a peripheral edge 13, which has a release recess 12. The locking plate 9 is also arranged to be turned in relation to the driver 11. The driver has a torsion projection 14, which is connected to the cam piece 5. The driver 11 also has a hole 15, in which the latch piece 10 is placed, and the body 2 has a recess 16 for the latch piece 10. The recess 16 is seen in FIG. 4 and FIG. 5.

FIG. 4 and FIG. 5 illustrate the operation of the blocking mechanism and at the same time also the locking and opening of the electronic padlock. In FIG. 4 the electronic padlock is locked. In FIG. 5 the locking is released and the electronic padlock can be opened. The blocking mechanism 8 is arranged to prevent turning of the cam piece 5 (FIG. 1), when the latch piece 10 is partly in the recess 16 and partly in the driver hole 15, and the peripheral edge 13 of the locking plate 9 prevents the latch piece 10 from moving toward the pivot shaft 7. The driver 11 cannot turn, whereby also the cam piece 5 cannot turn by means of the torsion projection 14.

The blocking mechanism 8 is also arranged to allow turning of said cam piece 5, when the electronic actuator 6 has by turning the pivot shaft 7 turned the release recess 12 of the locking plate 9 to the driver hole 15, allowing the latch piece 10 to move toward the pivot shaft 7. Still continuing the turning of the pivot shaft 7 with the electronic actuator 6, in addition to the locking plate 9, the driver 11 and the thereto connected cam piece 5 also turn. FIG. 5 shows such a situation, where also the driver 11 is turned. Because the driver is via the torsion projection connected to the cam piece 5, also the cam piece is turned, whereby the recesses 25 in the cam piece are toward the latch parts 10. Thus, the latch parts can move away from the recesses 26 in the shackle 3, and the shackle can be pulled out of the body 2.

The blocking mechanism 8 additionally comprises a spring 17, which is supported on the driver 11 and which spring has a spring head 18 (FIG. 7 and FIG. 8). The spring is made of a metal suited for the purpose. The locking plate 9 comprises a hole 19 (FIG. 6) for the spring head 18. The spring head 18 is in the hole, when the latch piece 10 is partly in the recess 16 and partly in the driver hole 15, and the peripheral edge 13 of the locking plate prevents the latch piece 10 from moving toward the pivot shaft 7. The electronic padlock is thus locked. If someone attempts to erroneously open the electronic padlock for example by knocking, the spring 17 strives to prevent turning of the locking plate 9 possibly caused by knocking or other vibrations and other manners. The spring thus strives to hold the locking plate in the position of FIG. 4, i.e. to keep the electronic padlock locked, and to prevent turning of the locking plate in both directions. The directions of the knocking and vibration thus does not matter.

Additionally, the structure of the blocking mechanism is also otherwise such that achieving vibrations and hits is very unlikely to make the locking plate 9 turn enough so that the electronic padlock can be opened. To begin, the locking plate should be made to turn so that the release recess 12 is by the driver hole 15, and then further so that the driver further turns, so that the recesses 25 of the cam piece 5 are toward the latch pieces 10. The spring also does its part to hold the support plate in place in the direction of its radius. This is advantageous, especially if the shaft 7 of the electronic padlock has somehow been damaged.

From FIGS. 4-6 is seen that there can be protrusions 20 away from the pivot shaft 7 on the peripheral edge 13 of the locking plate. The protrusions are used for transmitting torque from the locking plate 9 to the driver 11 (as also the latch pieces, especially when turning the locking plate in the direction of the locking). Protrusions can also be used with a sensor/switch 32 to detect the state of the lock (e.g. if it is locked). The protrusions also form a support for the locking plate 9 against the body 2.

From FIG. 6 can also be seen that the driver 11 has support surfaces 21 for the spring 17. The counter-support surfaces 21A of the spring settle against the support surfaces. It can be seen that the spring 17 stays in place in relation to the driver 11 even if the driver is turned. It can also be seen that the head 18 of the spring is not in the hole 19 of the locking plate when the locking plate is turned away from the locking position (the position in FIG. 4).

From FIG. 6 and FIG. 8 can be seen that the driver 11 can have installation protrusions 22, 23 for the locking plate 9. The protrusions 23 are bigger than the protrusions 22 in the embodiment of the figures. The locking plate 9 is set between the protrusions 22 and the protrusions 23. The protrusions 23 also support the spring. The installation protrusions 22, 23 thus make it easier to install the parts against each other.

It can be seen that the electronic padlock according to the invention can be implemented in many different ways. For example, the shaft 7 of the electronic actuator is shown with a cross-shape in the embodiment of the figures, but it can also have another shape. The shaft 7 of the figures is implemented so that it reaches out from the electronic actuator 6 and can be set in a shaft-shaped hole 24. The hole is in the middle of the locking plate 9 for the pivot shaft. It is of course also possible that the shaft 7 of the electronic actuator forms a recess with another shape, into which a correspondingly shaped protrusion in the locking plate is set.

The electronic actuator 6 can be an electric motor or a solenoid. Using an electric motor is usually more straightforward, but turning the locking plate can be done also with a solenoid. Thus, the electronic actuator 6 has some kind of power transmission to transmit the movement of the solenoid (such as the movement of the peg of the solenoid) into a movement turning the shaft 7.

The latch piece 10 is a ball or a roller. The length and width of the roller are the same or almost the same. Thus, the blocking mechanism 8 does not take up unnecessary space in the direction of the shaft 7 of the electronic actuator, and the blocking mechanism can fit in a relatively small space. Additionally, from FIG. 4 and FIG. 5 can be seen a sensor/switch 32, with which the turning of the locking plate 9 can be detected. This information can be used for detecting the state of the electronic padlock. Additionally, it can be used for locking the electronic padlock. The electronic padlock is locked so that the shackle is moved toward the body 2, so that it forms a closed loop with the body. This can be detected for example with a possible second sensor (not shown in the figures). A code can also be entered into the electronic padlock in order to lock the lock via the communication part 30. Information regarding a desire to lock the electronic padlock is transmitted for example as a control command to the electronic actuator 6, which turns the shaft 7 and thus also the locking plate and the driver 11 into the locking state. The locking state is seen in FIG. 1 and FIG. 4.

The solution according to the invention effectively prevents erroneous turning of the cam piece 5, if the internal structures of the electronic actuator 6 cannot hold the locking. The solution effectively prevents erroneous turning of the cam piece 5 away from the locking position for example by knocking or heating the electronic padlock. Heating can possibly damage the parts of the electronic actuator, so that the cam piece could turn more freely.

The electronic padlock according to the invention can be realized in many different ways, as can be discerned from the description above. The invention is thus not limited to the examples presented herein, but can be implemented in different ways within the scope of the independent claim.

The invention claimed is:

1. An electronic padlock, which comprises a body and a shackle, which body has latch parts, a cam piece and an electronic actuator, which electronic actuator comprises a pivot shaft, which pivot shaft is arranged to turn the cam piece to release the latch parts from a locking state and to turn the cam piece to hold the latch parts in the locking state, in which locking state the latch parts prevent the shackle from being moved to open the electronic padlock, characterized in that between the electronic actuator and cam piece there is a blocking mechanism in the direction of the pivot shaft of the electronic actuator, which blocking mechanism connects the pivot shaft of the electronic actuator functionally to the cam piece to turn it with the electronic actuator and prevent any other turning of the cam piece in relation to the body, which blocking mechanism comprises a locking plate, a latch piece and a driver, which locking plate is connected to the pivot shaft of the electronic actuator, which locking plate has a peripheral edge, which has a release recess and which locking plate is arranged to be turned in relation to the driver, which driver has a torsion projection, which is connected to the cam piece, and which driver has a hole, in which the latch piece is placed, and the body has a recess for the latch piece, which blocking mechanism is arranged to prevent turning of the cam piece, when the latch piece is partly in the recess and partly in the driver hole, and the peripheral edge of the locking plate prevents the latch piece from moving toward the pivot shaft, and which blocking mechanism is arranged to allow turning of said cam piece, when the electronic actuator has by turning the pivot shaft turned the release recess of the locking plate to the driver hole, allowing the latch piece to move toward the pivot shaft, whereby the peripheral edge of the locking plate has protrusions away from the pivot shaft for transmitting torque from the locking plate to the driver whereby still continuing the turning of the pivot shaft with the electronic actuator, in addition to the locking plate, the driver and the thereto connected cam piece also turn, the blocking mechanism further comprising a spring, which is supported on the driver and which spring has a spring head, and which locking plate comprises a hole for the spring head, which spring head is in the hole, when the latch piece is partly in the recess and partly in the driver hole, and the peripheral edge of the locking plate prevents the latch piece from moving toward the pivot shaft.

2. Electronic padlock according to claim 1, wherein the latch piece is a ball or a roller, the length and width of which roller are the same or almost the same.

3. The electronic padlock according to claim 1, wherein the peripheral edge of the locking plate has protrusions away from the pivot shaft.

4. The electronic padlock according to claim 1, wherein the driver has support surfaces for the spring.

5. The electronic padlock according to claim 4, characterized in wherein the driver has installation protrusions for the locking plate.

6. The electronic padlock according to claim 1, wherein there is a hole for the pivot shaft in the centre of the locking plate.

7. The electronic padlock according to claim 1, wherein the electronic actuator is an electric motor or a solenoid.

* * * * *